United States Patent [19]

Andrassy

[11] 4,089,326
[45] May 16, 1978

[54] HEATER
[76] Inventor: Stella Andrassy, Ridge Rd., Kingston, N.J. 08528
[21] Appl. No.: 749,855
[22] Filed: Dec. 13, 1976
[51] Int. Cl.² .............................................. F24J 3/02
[52] U.S. Cl. ..................... 126/271; 138/110
[58] Field of Search ............... 126/270, 271; 138/110
[56] References Cited
U.S. PATENT DOCUMENTS

| | | | |
|---|---|---|---|
| 1,249,038 | 12/1917 | Dabney | 138/110 |
| 2,619,125 | 11/1952 | Eickmeyer et al. | 138/110 |
| 3,039,453 | 6/1962 | Andrassy | 126/271 |
| 3,194,228 | 7/1965 | Bargues | 126/271 |

Primary Examiner—Carroll B. Dority, Jr.
Attorney, Agent, or Firm—Albert Sperry; Frederick A. Zoda; John J. Kane

[57] ABSTRACT

A solar fluid heater embodying a plurality of loops of flexible plastic tubing is provided with means for protecting and reinforcing the return bends at the ends of parallel lengths of the tubing to protect them against distortion, undue expansion or rupture upon prolonged usage or when the tubing is subjected to high temperatures or pressures.

2 Claims, 6 Drawing Figures

HEATER

FIELD OF THE INVENTION

Solar heaters for liquids or other fluids have been employed for years and frequently embody a plurality of loops or coils of tubing arranged to be exposed to solar radiation so as to absorb heat and raise the temperature of the liquid or other fluid contained therein or passing through the tubing. One particularly form of such solar heater is that shown and described in applicant's U.S. Pat. No. 3,039,453.

While the construction of said patent has proven very successful in use, it has been found that the return bends of the tubing when formed of plastic or other flexible material tend to expand, distort or even burst when the fluid circulated through the tubing attains a high temperature or is subjected to excessive pressure.

In order to overcome such difficulties, it has been found to be desirable to reinforce or protect the return bend portions of the tubing against such damage or injury while the extended lengths or parallel runs of the tubing remain exposed for absorption of heat from the sun. Such protection can be effected by applying reinforcing means to the return bend portions or by shielding the return bends from solar radiation or by utilizing both methods of protection.

THE DRAWINGS

Figure 1:
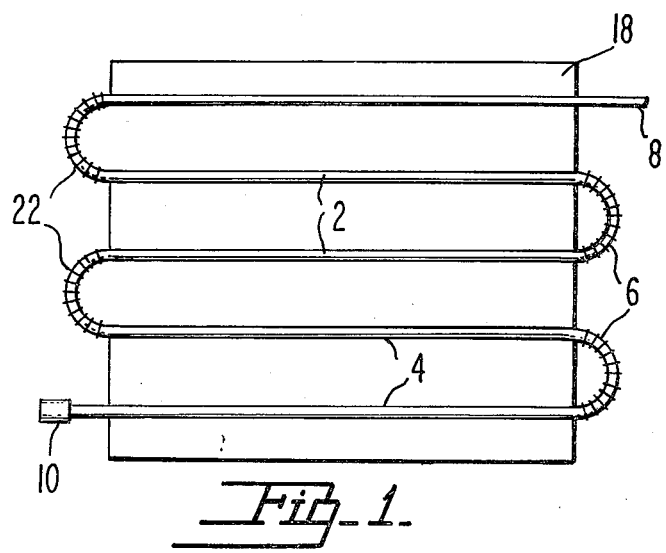
FIG. 1 is a plan view of a typical form of solar heater to which the present invention has been applied.
Figure 2:
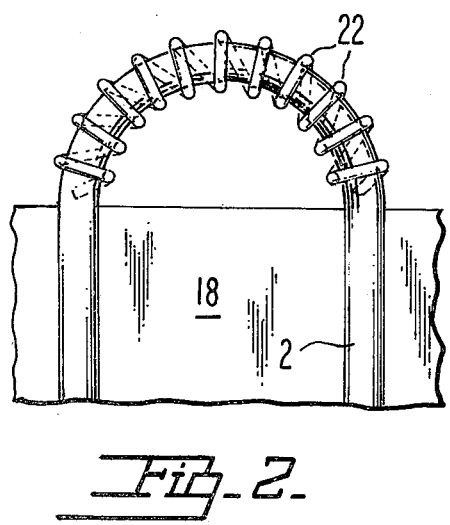
FIG. 2 is an enlarged view of a return bend of the tubing to which one form of protecting means shown in FIG. 1 has been applied.
Figure 3:
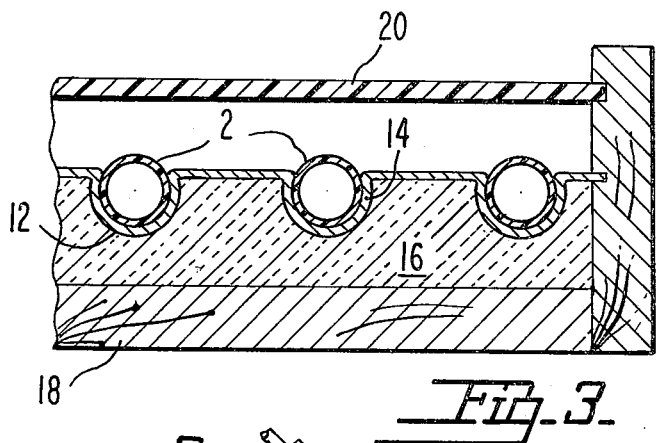
FIG. 3 is a sectional view through an assembly of the type illustrated in FIG. 1.

In that form of the invention chosen for purposes of illustration in FIGS. 1, 2 and 3, an entended length of flexible tubing 2 is arranged with a plurality of parallel sections 4 connected to each other by return bend portions 6 so as to provide a continuous path for the circulation of fluid from an inlet 8 to an outlet 10. The tubing may be formed of any suitable or preferred material such as polyethylene, "Teflon", vinyl and other plastics, resins or the like. If desired, the flexible material of which the tubing is formed may be mixed with aluminum, copper or other metal powder to increase the heat conductivity thereof so that the transfer of heat to the fluid circulated through the tubing will take place more rapidly and efficiently.

As described in said U.S. Pat. No. 3,039,453 the tubing is held in place and embraced within grooves or recesses 12 formed by a corrugated liner 14 made of sheet aluminum or the like. The grooves 12 preferably extend about the circumference of the tubing to an extent exceeding 180° so that the parallel sections of the tubing may be snapped into place and securely held in position while the upper surfaces thereof will be exposed to absorb heat from the sun. The metal liner in which the tubing is held is preferably coated with black plait or other heat absorbing material to increase the absorption of heat thereby. The tubing and liner are supported by thermal insulating material 16 such as urethane foam, fiberglass, asbestos or the like and mounted in a wooden or other frame 18. A transparent cover member 20 is mounted on the frame 18 above the flexible tubing 2 to protect the coil from wind currents which might tend to reduce the temperature maintained within the enclosure.

The construction thus provided is simple and inexpensive to produce and assemble and requires no machining or welding to manufacture. Moreover, by using flexible tubing the danger of rupture of the tubing upon freezing of water within the tubing during winter time is overcome. While the danger of such rupture of the tubing forming the parallel sections thereof is reduced by the use of flexible material, it is found in practice that the return bend portions 6 thereof are necessarily stressed in forming the return bends. As a result such portions tend to "balloon" or distort or rupture when subjected to high temperatures or pressure or after long exposure to solar radiation.

In accordance with the present invention such "balooning", rupture or distortion of the return bend portions of the flexible tubing is prevented or reduced by protecting or strengthening such portions while permitting limited deflection thereof to allow for normal thermal expansion of the parallel sections of the tubing. Thus as shown in FIGS. 1 and 2, a coil of flexible wire 22 is wrapped about and in contact with the return bend portions of the tubing. Such wire strengthens the tubing and limits or restricts the distortion of expansion thereof. At the same time, the adjacent turns of the coil of wire are capable of limited relative movement sufficient to accommodate permissible movement and expansion of the flexible tubing.

Figure 4:
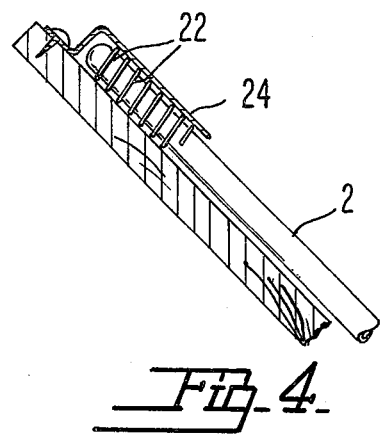
FIG. 4 is a sectional view illustrating an alternative construction embodying the present invention.

Further as shown in FIG. 4, the return bend portions of the tubing may be covered and shielded from solar radiation by placing a cover member 24 over the return bend portions 6 of the flexible tubing. In this way prolonged exposure of the return bend portions to actinic rays which might cause the plastic material to deteriorate or weaken is prevented.

The solar heating unit may be located in any desired position for exposure to the sun on the roof or wall of a building or on the ground adjacent a swimming pool to heat water circulated therethrough to a suitable temperature for its intended use.

Figure 5:
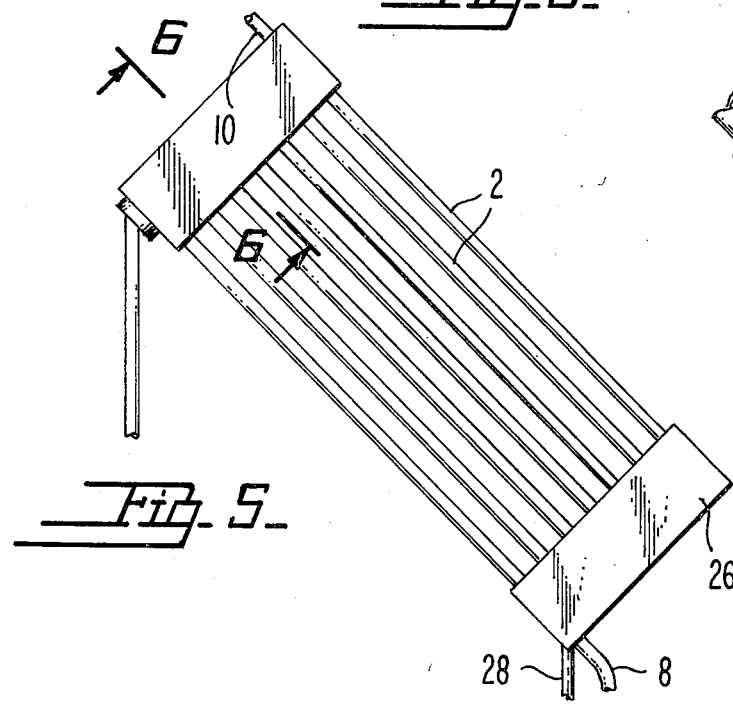
FIG. 5 is a side elevation illustrating a further alternative embodiment of the present invention.
Figure 6:
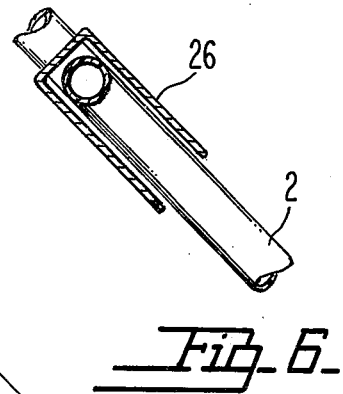
FIG. 6 is a sectional view taken on the line 6—6 of FIG. 5.

As shown in FIGS. 5 and 6, the solar heat exchanger of the present invention can be arranged to serve as a fence or wind-break about the sides of a swimming pool, patio or elsewhere. In such constructions the shield or cover member 26 may be in the form of a sleeve which can be slipped over the return bend portions of the tubing. A drain 28 serves to permit drainage of rain from the sleeve-like cover whereas rain will not accumulate in the downwardly turned cover member at the upper end of the assembly.

The constructions provided in accordance with the present invention may further be used to cool a house or building at night time by cooling water by radiation therefrom at night time. The water thus cooled may be stored in a chamber for circulation as an air-conditioning means if desired.

It will thus be apparent that the equipment embodying the present invention is simple and inexpensive to produce and use and may be installed in roofs, walls and elsewhere either as original equipment or as an accessory to be applied to existing structures. At the same time it serves to utilize solar energy and is operable continuously without cost or expense. The economics thus effected further serve to conserve the national energy resources although it will be apparent that supplemental heating means may be employed in combination with the present invention where necessary.

I claim:

1. A solar fluid heater comprising a length of flexible tubing mounted in contact with a dark colored heat absorbing body with said tubing arranged with a plurality of sections thereof extending in parallel relation and connected at the ends thereof by return bend portions, and means for protecting said return bend portions from undesired expansion or distortion under the influence of heat and pressure including restraining means in the form of a coil of wire encircling the tubing and in contact therewith throughout said return bend portions, and means extending over said return bend portions in position to shield said portions from solar radiation.

2. A solar fluid heater as defined in claim 1 wherein said flexible tubing is located within an enclosure having a transparent member extending over the same to protect said tubing from wind currents and the like.

* * * * *